(12) United States Patent
Lee

(10) Patent No.: US 6,433,497 B1
(45) Date of Patent: Aug. 13, 2002

(54) DRIVE CIRCUIT OF A THREE PHASE BLDC MOTOR

(75) Inventor: Han-Seung Lee, Seoul (KR)

(73) Assignee: Fairchild Korea Semiconductor Ltd. (KR)

( * ) Notice: Subject to any disclaimer, the term of this patent is extended or adjusted under 35 U.S.C. 154(b) by 0 days.

(21) Appl. No.: 09/565,298

(22) Filed: May 4, 2000

(30) Foreign Application Priority Data

May 20, 1999 (KR) ............................................. 99 18327

(51) Int. Cl.[7] ................................................. H02P 5/06
(52) U.S. Cl. ....................... 318/254; 318/138; 318/139; 318/245; 318/254; 318/434; 318/439; 318/799; 318/808; 388/812; 388/815
(58) Field of Search ................................ 318/138, 139, 318/254, 245, 434, 439, 799, 808, 812, 817, 815

(56) References Cited

U.S. PATENT DOCUMENTS

| | | | | |
|---|---|---|---|---|
| 5,122,715 A | * | 6/1992 | Kimmura et al. ............ | 318/138 |
| 5,144,209 A | * | 9/1992 | Ingji et al. .................... | 318/254 |
| 5,182,499 A | * | 1/1993 | Inaji et al. .................... | 318/254 |
| 5,367,234 A | * | 11/1994 | Di'Tucci ....................... | 318/254 |
| 5,475,290 A | * | 12/1995 | Tani et al. .................... | 318/434 |
| 5,616,994 A | * | 4/1997 | Nagaoka et al. ............. | 318/254 |
| 5,661,383 A | * | 8/1997 | Schlager et al. ............. | 318/439 |
| 5,783,917 A | * | 7/1998 | Takekawa .................... | 318/439 |
| 5,818,179 A | * | 10/1998 | Kokami et al. .............. | 318/254 |
| 5,969,491 A | * | 10/1999 | Viti et al. ..................... | 318/254 |
| 5,994,869 A | * | 11/1999 | Becerra ........................ | 318/729 |
| 6,153,993 A | * | 11/2000 | Oomura et al. .............. | 318/434 |

* cited by examiner

Primary Examiner—Robert E. Nappi
Assistant Examiner—Tyrone Smith
(74) Attorney, Agent, or Firm—Blakely Sokoloff Taylor & Zafman

(57) ABSTRACT

Disclosed is a three phase BLDC motor driving circuit which makes a BEMF voltage generated in a motor lower than a voltage source and makes a difference between the BEMF voltage and the voltage source greater than a saturation voltage of a transistor. An emitter is coupled to the voltage source and a collector is coupled to a three phase coil so that the voltage between the emitter and collector of the transistor supplying a current to the three phase coil attenuates to a first level so as not to saturate the transistor. The present invention comprises a voltage reducing unit, coupled to the three phase coils, rectifying a back electromotive force (BEMF) voltage generated in the three phase coils and generating a first voltage, the first voltage being reduced to a first level; a reference voltage unit, positioned between the voltage source and the ground, reducing the voltage source to a second level that is greater than the first level; and a differential amplifier having a first input terminal coupled to an output terminal of the voltage reducing unit, having a second input terminal coupled to an output terminal of the reference voltage unit, and having a third input terminal coupled to the voltage source, and amplifying an output of a corresponding output terminal as a comparison difference between a voltage of the first input terminal and a voltage of the second input terminal, and controlling to make the voltages of the first and second input terminals identical.

13 Claims, 4 Drawing Sheets

DRIVE CIRCUIT OF A THREE PHASE BLDC MOTOR

BACKGROUND OF THE INVENTION (a) Field of the Invention

The present invention relates to a three phase brushless direct current (BLDC) motor. More specifically, the present invention relates to a drive circuit of a three phase BLDC motor.

(b) Description of the Related Art

A conventional three phase BLDC motor comprises a rotor including a plurality of magnetic poles, and a stator including U, V and W phase coils. The three phase BLDC motor supplies current to each phase of the coil of the stator, and generates a magnetic field in the coil using this current to rotate the rotor. In order for the three phase BLDC motor to supply the current to the three phase coils and rotate the motor, a driving circuit is necessary. The driving circuit comprises a first switch unit including a plurality of switches positioned between a voltage source and each coil, and an inverter including a second switch unit including a plurality of switches positioned between each coil and the ground.

FIG. 1 shows a block diagram of a conventional driving circuit of a general three phase BLDC motor, including the inverter. As shown, the three phase motor driving circuit comprises three phase coils U, V and W, an inverter 1, a first transistor driver 2, a second transistor driver 3, a driving controller 4, a current sensing resistor Rsen and an error amplifier AMP.

Here, three blocks 11, 12 and 13 that supply the current to the three phase coils U, V and W according to control signals of the first transistor driver 2 correspond to the first switch unit, and three blocks 14, 15 and 16 that supply to the current sensing resistor Rsen the current flowing through the three phase coils U, V and W according to control signals of the second transistor driver 3 correspond to the second switch unit.

The first and second switch units of the inverter comprise transistors and selectively turn on each transistor so as to supply to the three phase coils the current, with a phase difference of 120°.

Therefore, the current is alternately supplied to each coil of the three phase coils U, V and W, and the current forms a voltage Vsen through one of the blocks 14, 15 and 16 by way of the current sensing resistor Rsen.

The voltage Vsen influences the error amplifier AMP, driving controller 4, and first and second transistor drivers 2 and 3, forming a feedback circuit, and thereby the voltage Vsen becomes identical with a non-inverting voltage Vref of the error amplifier AMP.

The motor normally operates through the above-noted operations. However, since the blocks 11, 12 and 13 of the first switch unit are comprised of transistors, when the transistors are turned on and off, the blocks become saturated. The reason for this is that in the switching mode, the blocks 11, 12 and 13 are in the saturation point region where the voltage between an emitter and collector is between 0.1 to 0.2 volt. As the blocks 11, 12 and 13 are saturated, it is difficult to control a motor rotating at a low speed since the blocks 11, 12 and 13 immediately indicate the changes of the outputs according to the switching signals.

Hence, the blocks 11, 12 and 13 are configured as shown in FIG. 2 in order that the blocks not be in the saturation point region during the switching operation. FIG. 2 shows a detailed drawing of a block 11 of the blocks 11, 12 and 13 as shown in FIG. 1. Since the blocks 11, 12 and 13 are identically configured, only the block 11 will be described.

An electric potential Vce1 between a collector and emitter of a transistor Q1 of FIG. 2 is found through Equation 1.

$$Vce1 = Vbe2 + (R1 \times Ir1) - Vbe3 = R1 \times Ir1 \qquad \text{Equation 1}$$

Referring to Equation 1, Ir1 represents the current flowing to a resistor R1, Vce2 represents an electric potential between a base and emitter of a transistor Q2, and Vbe3 represents an electric potential between a base and emitter of a transistor Q3.

Hence, when adjusting values of the resistor R1, the voltage between an emitter and collector of a transistor Q6 can be set outside the range 0.1 to 0.2 volt, which is the saturation voltage.

However, this conventional saturation protection of the transistor is possible only when output terminals are configured as pnp and npn transistors, and if the output terminals are configured with only the pnp transistors, the transistors cannot be protected from saturation.

SUMMARY OF THE INVENTION

It is an object of the present invention to provide a method for a transistor to be protected from saturation regardless of the configuration of the transistor of an output terminal in a driving circuit of a three phase BLDC motor, and thereby be suitable in a system for controlling the motor speed when it rotates slowly.

In one aspect of the present invention, a three phase brushless direct current (BLDC) motor driving circuit comprises a motor that includes a rotor having three phase coils and a plurality of magnetic poles; an inverter that controls directions of a current supplied to the three phase coils according to supplied switching signals and includes a first switch unit including a plurality of transistors each positioned between a voltage source and the three phase coils, and a second switch unit including a plurality of transistors each positioned between the first switch unit and the ground; and an inverter controller that controls operations of the inverter. The three phase BLDC motor driving circuit further comprises a voltage reducing unit coupled to the three phase coils, rectifying a back electromotive force (BEMF) voltage generated in the three phase coils and generating a first voltage, the first voltage being reduced to a first level; a reference voltage unit, positioned between the voltage source and the ground, adjusting the voltage source to be reduced to a second level that is greater than the first level; and a differential amplifier having a first input terminal coupled to an output terminal of the voltage reducing unit, having a second input terminal coupled to an output terminal of the reference voltage unit, and having a third input terminal coupled to the voltage source, and amplifying an output of a corresponding output terminal to an amount equaling the difference between a voltage of the first input terminal and a voltage of the second input terminal, and controlling to make the voltages of the first and second input terminals identical.

The circuit further comprises an error amplifier that compares the voltage supplied through the second switch unit with a set voltage and controls the current supplied to the differential amplifier by using a voltage corresponding to a comparison difference so that the voltage supplied through the second switch unit becomes identical with the set voltage.

The voltage reducing unit performs a half wave rectification and a smoothing operation on the BEMF voltage that is generated in the three phase coil and has a phase difference of 120°, and reduces the maximum value of the BEMF voltage to an amount of the first level.

The voltage reducing unit comprises a first diode having an anode coupled to a U phase coil; a second diode having an anode coupled to a V phase coil; a third diode having an anode coupled to a W phase coil; a resistor having one end coupled to cathodes of the first, second and third diodes and having another end grounded; and a capacitor, coupled to the resistor in parallel, having one end coupled to an input terminal of the differential amplifier.

The reference voltage unit comprises a plurality of diodes, specifically three static voltage diodes; each coupled to the voltage source in series.

The first level is lesser than the second level, and a difference between the first and second levels is more than a saturation voltage of the transistor.

The differential amplifier comprises first and second pnp transistors, each having an emitter coupled to the voltage source and having a common base; a third pnp transistor having an emitter coupled to a collector of the first pnp transistor, having a collector coupled to an input terminal of a first transistor controller, and having a base coupled to an output terminal of a half wave rectifier; and a fourth pnp transistor having an emitter coupled to the collector of the first pnp transistor, having a collector coupled to an input terminal of a second transistor controller, and having a base coupled to the output terminal of the reference voltage unit.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
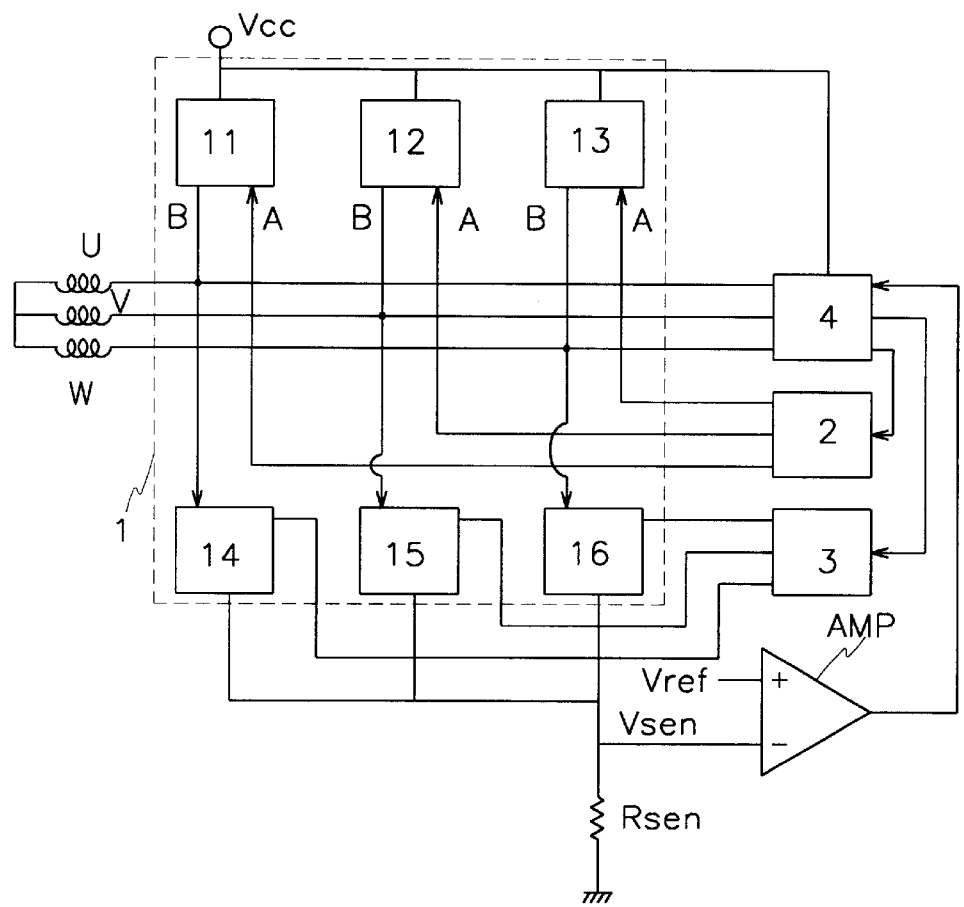
FIG. 1 is a block diagram of a driving circuit of a conventional three phase BLDC motor.
Figure 2:
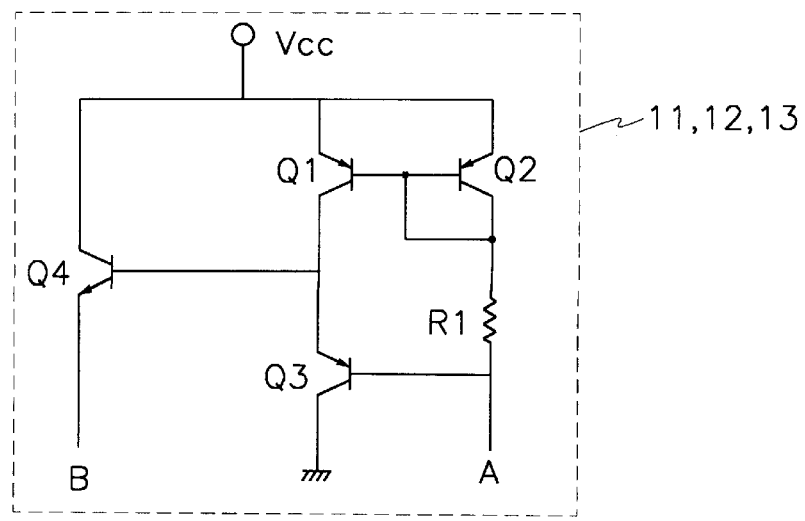
FIG. 2 is a detailed schematic diagram of a part of an output unit of FIG. 1.
Figure 3:
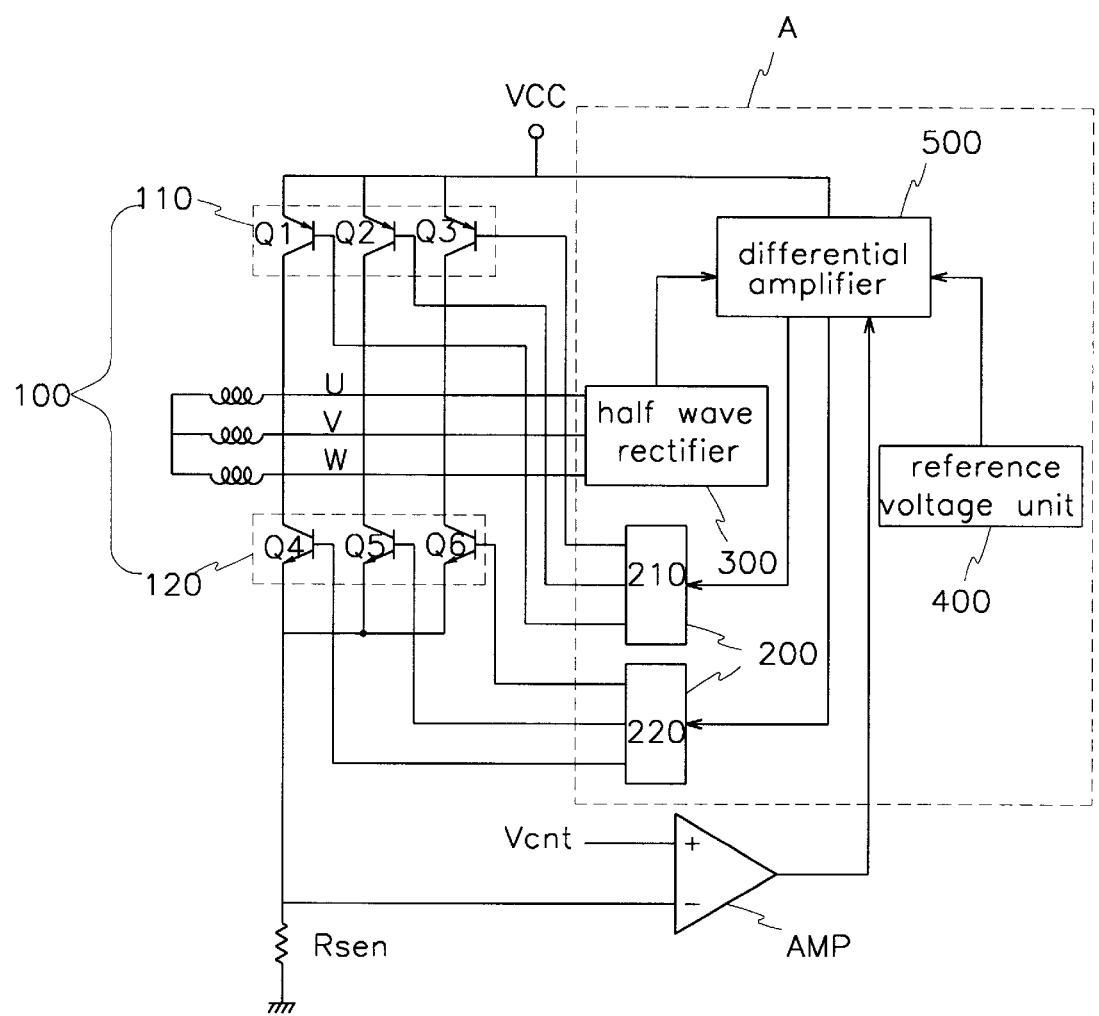
FIG. 3 is a schematic diagram of a driving circuit of a three phase BLDC motor according to a preferred embodiment of the present invention.

FIG. 3 is a schematic diagram of a driving circuit of a three phase BLDC motor according to a preferred embodiment of the present invention.

As shown, the driving circuit of a three phase BLDC motor comprises three phase coils U, V and W, an inverter 100, an inverter controller 200, a half wave rectifier 300, a reference voltage unit 400, a differential amplifier 500, a current sensing resistor Rsen, and an error amplifier AMP.

The three phase coils U, V and W are spaced at 120° to each other on the stator.

The inverter 100 comprises a first transistor unit 110 that includes a pnp transistor Q1 having an emitter coupled to the voltage source Vcc and having a collector coupled to the U phase coil U, a pnp transistor Q2 having an emitter coupled to the voltage source Vcc and having a collector coupled to the V phase coil V, and a pnp transistor Q3 having an emitter coupled to the voltage source Vcc and having a collector coupled to the W phase coil W; and a second transistor unit 120 that includes an npn transistor Q4 having a collector coupled to the transistor Q1 and the U phase coil U and having a grounded emitter, an npn transistor Q5 having a collector coupled to the transistor Q2 and the V phase coil V and having a grounded emitter, and an npn transistor Q6 having a collector coupled to the transistor Q3 and the W phase coil W and having a grounded emitter.

Hence, the inverter 100 sets the directions of the current so that the current according to the voltage source Vcc flows to the ground through two coils of the three phase coils following previously set patterns.

That is, in the inverter 100, the transistors Q1 and Q5 are turned on in order for the current to flow to the V phase coil V through the U phase coil U, the transistors Q1 and Q6 are turned on in order for the current to flow to the W phase coil W through the U phase coil U, the transistors Q2 and Q6 are turned on in order for the current to flow to the W phase coil W through the V phase coil V, the transistors Q2 and Q4 are turned on in order for the current to flow to the U phase coil U through the V phase coil V, the transistors Q3 and Q4 are turned on in order for the current to flow to the U phase coil U through the W phase coil W, and the transistors Q3 and Q5 are turned on in order for the current to flow to the V phase coil V through the W phase coil W.

The switching operations of the transistors Q1 to Q6 are controlled by the inverter controller 200, which controls the inverter 100 so that the current supplied to each coil U, V and W has a phase difference of 120°.

Here, the inverter controller 200 comprises a first transistor controller 210 having three output terminals coupled to the bases of the transistors Q1, Q2 and Q3, and a second transistor controller 220 having three output terminals coupled to the bases of the transistors Q4, Q5 and Q6.

The first transistor controller 210 makes signals output through the three output terminals have a phase difference of 120°, and the second transistor controller 220 makes signals output through the three output terminals have a phase difference of 120° so that each transistor Q1 through Q3 of the inverter 100 performs switching operations having the phase difference of 120° and each transistor Q4 through Q6 performs switching operations having the phase difference of 120°. The control operations of the inverter controller 200 drive the motor in the forward direction and depend on output signals of the differential amplifier 500.

The differential amplifier 500 varies the status of the signals output to the inverter controller 200 according to the output signals of the half wave rectifier 300 and the reference voltage unit 500, and precisely adjusts the status of the signals output to the inverter controller 200 according to feedback signals output from the error amplifier AMP through the current sensing resistor Rsen.

Here, one terminal of the current sensing resistor Rsen is coupled to emitters of the transistors Q4, Q5 and Q6, and other terminal is grounded. Therefore, the current sensing resistor Rsen changes the current flowing through the transistors Q4 through Q6 into the voltage Vsen so as to supply it to the error amplifier AMP.

The error amplifier AMP has an inverting terminal coupled to one terminal of the current sensing resistor Rsen and has a non-inverting terminal coupled to a set voltage Vcnt. Therefore, the error amplifier AMP outputs error signals to the differential amplifier 500 if the voltages of the three phase coils U, V and W are not identical with the set voltage Vcnt. At this time, the differential amplifier 500 has varied amounts of current supplied from the voltage source Vcc according to the signals of the error amplifier AMP.

Therefore, the current sensing voltage Vsen input to the inverting terminal of the error amplifier AMP tends to identity with the voltage of the non-inverting terminal of the error amplifier AMP by way of the feedback circuit comprised of the differential amplifier 500, inverter controller 200 and inverter 100.

The half wave rectifier 300 has input terminals coupled to each coil of the three phase coils U, V and W, and performs a half wave rectification on the back electromotive force (BEMF) voltage generated in the three phase coils so as to generate a half wave rectified voltage Va, and then outputs the voltage Va to the differential amplifier 500. The reference voltage unit 400 has an input terminal coupled to the voltage source Vcc, and it outputs a voltage Vb, that is reduced to a predetermined level from the source voltage Vcc, to the differential amplifier 500.

The differential amplifier 500 then receives the output voltage Va of the half wave rectifier 300 and the output voltage Vb of the reference voltage unit 400 and performs the differential amplification on the received voltages Va and Vb, and outputs corresponding result signals to the first and second transistor controllers 210 and 220.

Figure 4:
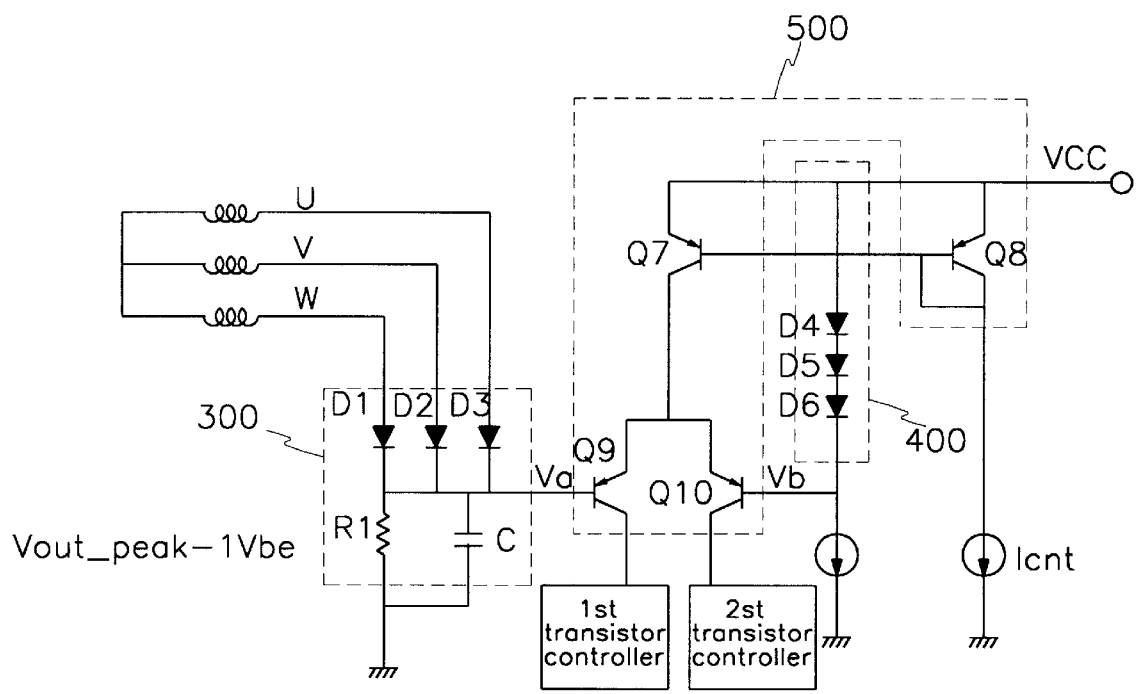
FIG. 4 is a detailed schematic diagram of an important part in the driving circuit of the three phase BLDC motor according to the preferred embodiment of the present invention.
Figure 5:
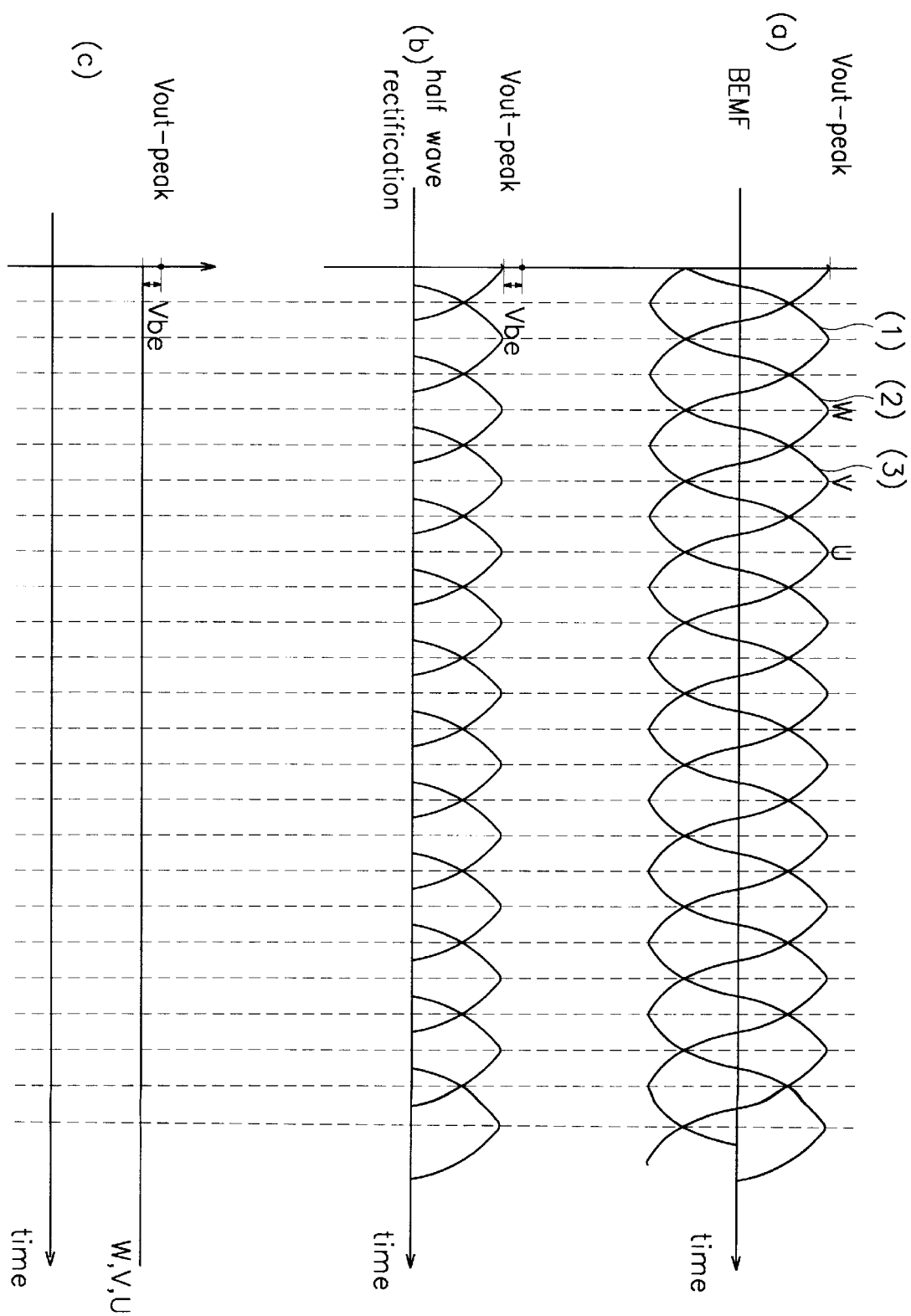
FIGS. 5(a) to (c) are signal waveforms of the driving circuit of the three phase BLDC motor according to the preferred embodiment of the present invention.

Referring to FIGS. 4 and 5, the half wave rectifier 300, reference voltage unit 400 and differential amplifier 500 will now be described.

FIG. 4 shows a detailed schematic diagram of an important part of the driving circuit of the three phase BLDC motor according to the preferred embodiment of the present invention, that is, it shows a detailed circuit diagram of the half wave rectifier 300, reference voltage unit 400 and differential amplifier 500 which are included in part A of FIG. 3.

As shown in FIG. 4, the half wave rectifier 300 comprises a diode D1 having an anode coupled to the W phase coil W a diode D2 having an anode coupled to the V phase coil V, a diode D3 having an anode coupled to the U phase coil U, a resistor R1 having one end coupled to cathodes of the diodes D1, D2 and D3 and having a grounded other end, and a capacitor C coupled between the cathodes and the ground, coupled to the resistor R1 in parallel, and coupled to the input terminal of the differential amplifier 500. Here, the voltage at the capacitor C is Va.

The reference voltage unit 400 comprises a diode D4 having an anode coupled to the voltage source Vcc, a diode D5 having an anode coupled to a cathode of the diode D4, and a diode D6 having an anode coupled to a cathode of the diode D5 and having a cathode coupled to an input terminal of the differential amplifier 500. Here, the voltage at the cathode of the diode D6 is Vb.

The differential amplifier 500 comprises pnp transistors Q7 and Q8 each having an emitter coupled to the voltage source Vcc and having a common base, a pnp transistor Q9 having an emitter coupled to a collector of the transistor Q7, having a collector coupled to an input terminal of the first transistor controller 210, and having a base coupled to one end of the capacitor C, and a pnp transistor Q10 having an emitter coupled to the collector of the transistor Q7, having a collector coupled to an input terminal of the second transistor controller 220, and having a base coupled to the cathode of the diode D6. An output of the error amplifier AMP is supplied to the collector and base of the transistor Q8, and the output of the error amplifier AMP is indicated as a current source Icnt.

When the motor rotates at a constant speed, a BEMF voltage Vout with the phase difference of 120° occurs in the three phase coils U, V and W, as shown in FIG. 5(a).

FIGS. 5(a) to (c) are signal waveforms of the driving circuit of the three phase BLDC motor according to the preferred embodiment of the present invention. Referring to FIG. 5(a), a curve (1) represents a BEMF voltage occurring in the U phase coil U, a curve (2) represents a BEMF voltage occurring in the V phase coil V, and a curve (3) represents a BEMF voltage occurring in the W phase coil W.

The BEMF voltage Vout of FIG. 5 (a) is shown as half wave rectified waveforms in FIG. 5(b) by turning on the diodes D1, D2 and D3. The half wave rectified BEMF voltage of FIG. 5(b) is delayed for a predetermined constant time by the resistor R and capacitor C so as to be charged/discharged to/from the capacitor C, and thereby be smoothed to become DC voltage as shown in FIG. 5(c).

At this time, by turning on the diodes D1 through D3, the voltage discharged from the capacitor C is reduced to 0.7 volt which is a diode turn on voltage. In FIGS. 5(b) and (c), the diode turn-on voltage is represented as Vbe.

As a result, the BEMF voltage Va passing through the half wave rectifier 300 to the base of the transistor Q9 has a voltage, the maximum value of which is reduced to 0.7 volt, which is lower than the initially generated maximum BEMF Vout-peak.

Since output voltage of the reference voltage unit 400 supplied to the base of the transistor Q10 is supplied through the three diodes D4 through D6 coupled to the voltage source Vcc in series, the output voltage is below the voltage source by about 2.1 volt. That is, an output voltage Vb of the reference voltage 500 is below the reference voltage Vcc as the amount of 3 ×Vbe.

The error amplifier AMP compares the voltage input from the inverting terminal with the set voltage Vcnt, and supplies the current corresponding to the comparison difference to the base of the transistor Q8 of the differential amplifier 500.

The electrical potential differences between the base and emitter of the transistor Q8 are varied according to the current supplied from the error amplifier AMP so that the current flowing to the collector is varied. On the other hand, since the transistor Q7 forms a current mirror together with the transistor Q8, the current identical with the varied current flowing to the transistor Q8 flows to the collector of the transistor Q7, and this current is supplied to the emitters of the transistors Q9 and Q10.

The transistors Q9 and Q10 differently output the current to their collectors according to the relative ratio of the output voltage Va of the half wave rectifier 300 input to each base and the output voltage Vb of the reference voltage unit 400. That is, when the voltage Va is greater than the voltage Vb when the voltages Va and Vb are input to the transistors Q9 and Q10, the differential amplifier 500 increases the level of the signals output to the second transistor controller 220, and accordingly, makes the turn-on time of the transistors Q4 through Q6 vary so that the output voltage Va of the half wave rectifier 300 is reduced to be equal to the voltage Vb.

Conversely, when the voltage Vb is greater than the voltage Va when the voltages Va and Vb are input to the transistors Q9 and Q10, the differential amplifier 500 increases the level of the signals output to the first transistor controller 210, and accordingly, makes the turn-on time of the transistors Q1 through Q3 vary so that the output voltage Va of the half wave rectifier 300 is increased to be equal to the voltage Vb.

Here, since a person having ordinary skill in the art can easily implement a circuit for controlling the inverter and varying the output voltage Va of the half wave rectifier 400 using the above-noted principle, a detailed discussion will not be further provided.

Therefore, the base voltages of the transistors Q9 and Q10 are as follows:

$$Vout\text{-}peak\text{-}Vbe = Vcc\text{-}3Vbe$$

$$Vout\text{-}peak = Vcc\text{-}2Vbe \qquad \text{Equation 2}$$

where Vout-peak represents a maximum value of the BEMF voltage, Vbe represents a reduced voltage value by the half wave rectifier 300, that is about 0.7 volt, and 3Vbe represents a reduced voltage by the diodes D4, D5 and D6, that is about 2.1 volt.

Hence, a difference between the voltage source Vcc which is supplied to the emitters of the transistors Q1, Q2 and Q3 and the voltage Vout-peak supplied to the collectors referring to Equation 2 is as follows:

$$Vce\text{-}pnp = Vcc - Vout\text{-}peak = 2Vbe \quad \text{Equation 3}$$

where Vce-pnp represents an electric potential between the collectors and emitters of the pnp transistors Q1, Q2 and Q3.

Therefore, even when the transistors Q1, Q2 and Q3 of the first transistor unit 110 are turned on/off, the electric potential between the emitter and collector is always maintained over 2Vbe (=1.4V), and the transistors Q1, Q2 and Q3 remain not in the saturation region but in the active region.

Hence, it is easy to control the speed of the motor at a low speed and to change the voltage between the emitter and collector of the transistor that supplies the current to the three phase coils.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A three phase brushless direct current (BLDC) motor driving circuit for a motor that includes a rotor having three phase coils and a plurality of magnetic poles; an inverter that controls directions of a current supplied to the three phase coils according to supplied switching signals and includes a first switch unit including a plurality of transistors each positioned between a voltage source and the three phase coil, and a second switch unit including a plurality of transistors each positioned between a voltage source and the three phase coil, and an inverter controller that controls operations of the inverter, the three phase BLDC motor driving circuit comprising:

a voltage reducing unit, coupled to the three phase coils, rectifying a back electromotive force (BEMF) voltage generated in the three phase coils and generating a first voltage, the first voltage being reduced to a first level;

a reference voltage unit, coupled between the voltage source and the ground, reducing the voltage source to a second level; and a differential amplifier having a first input terminal coupled to an output terminal of the voltage reducing unit, having a second input terminal coupled to an output terminal of the reference voltage unit, and having a third input terminal coupled to the voltage source, and amplifying an output of a corresponding output terminal as an amount of difference between a voltage of the first input terminal and a voltage of the second input terminal, and controlling to make the voltages of the first and second input terminals substantially equal.

2. The circuit of claim 1, wherein the circuit further comprises an error amplifier that compares the voltage supplied through the second switch unit with a set voltage, determines a comparison difference, and controls the current supplied to the differential amplifier by using a voltage corresponding to the comparison difference so that the voltage supplied through the second switch unit becomes identical with the set voltage.

3. The circuit of claim 1, wherein the voltage reducing unit performs a half wave rectification and a smoothing operation on the BEMF voltage that is generated in the three phase coils, that have a phase difference of 120°, and reduces the maximum value of the BEMF voltage to the first level.

4. The circuit of claim 3, wherein the voltage reducing unit comprises a first diode having an anode coupled to a U phase coil; a second diode having an anode coupled to a V phase coil; a third diode having an anode coupled to a W phase coil; a resistor having one end coupled to cathodes of the first, second and third diodes and having another end grounded; and a capacitor, coupled to the resistor in parallel, having one end coupled to an input terminal of the differential amplifier.

5. The circuit of claim 1, wherein the reference voltage unit comprises a plurality of diodes.

6. The circuit of claim 1, wherein the reference voltage unit comprises three static voltage diodes, each coupled to the voltage source in series.

7. The circuit of claim 1, wherein the first level is lesser than the second level, and a difference between the first and second levels is more than a saturation voltage of the transistor.

8. The circuit of claim 1, wherein the differential amplifier comprises:

first and second pnp transistors each having an emitter coupled to the voltage source and having a common base;

a third pnp transistor having an emitter coupled to a collector of the first pnp transistor, having a collector coupled to an input terminal of a first transistor controller, and having a base coupled to an output terminal of a half wave rectifier; and a fourth pnp transistor having an emitter coupled to the collector of the first pnp transistor, having a collector coupled to an input terminal of a second transistor controller, and having a base coupled to the output terminal of the reference voltage unit.

9. A circuit for driving a motor that includes a rotor having three phase coils, an inverter that controls directions of a current supplied to the three phase coils, and an inverter controller that controls operations of the inverter, said circuit comprising:

a rectifier, coupled to the three phase coils, to rectify back electromotive force voltage generated in the three phase coils and output a rectified voltage;

a reference voltage unit, coupled to a voltage source, to receive a power supplied by the voltage source and output a reference voltage; and a differential amplifier, coupled to said rectifier and said reference voltage unit, to receive the rectified voltage and the reference voltage, wherein said differential amplifier generates an output signal which corresponds to an amount of difference between the rectifier voltage and the reference voltage, said output signal generated by said differential amplifier is used by said inverter controller to adjust the level of rectified voltage output by the rectifier.

10. The circuit of claim 9, wherein the voltage level of the rectified voltage output by said rectifier is adjusted to substantially match the reference voltage.

11. The circuit of claim 9, wherein the inverter comprises:
a first switch unit including a plurality of transistors each positioned between the voltage source and the three phase coil; and
a second switch unit including a plurality of transistors each positioned between the first switch unit and a ground.

12. The circuit of claim 9, wherein the rectifier performs a half wave rectification and a smoothing operation on the BEMF voltage that is generated in the three phase coils, that have a phase difference of 120°, and reduces the maximum value of the BEMF voltage to a first level.

13. The circuit of claim 12, wherein the first level is lesser than the voltage level of the reference voltage, and a difference between the first level and the reference voltage is more than a saturation voltage of the transistor.

* * * * *